United States Patent
Maack

(10) Patent No.: US 7,479,642 B2
(45) Date of Patent: Jan. 20, 2009

(54) DEVICE COMPRISING AN ARRAY OF ELECTRONIC ELEMENTS, BASED ON DIAGONAL LINE ROUTING

(75) Inventor: Hanns-Ingo Maack, Norderstedt (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 589 days.

(21) Appl. No.: 10/542,131

(22) PCT Filed: Jan. 9, 2004

(86) PCT No.: PCT/IB2004/000020
§ 371 (c)(1),
(2), (4) Date: Jul. 12, 2005

(87) PCT Pub. No.: WO2004/063803
PCT Pub. Date: Jul. 29, 2004

(65) Prior Publication Data
US 2006/0070274 A1    Apr. 6, 2006

(30) Foreign Application Priority Data
Jan. 15, 2003  (EP) .................... 03100070

(51) Int. Cl.
*G01T 1/00*   (2006.01)
(52) U.S. Cl. .................................. 250/394
(58) Field of Classification Search ............ 378/98, 378/98.2; 250/394; 348/448
See application file for complete search history.

(56) References Cited

U.S. PATENT DOCUMENTS

| | | | |
|---|---|---|---|
| 5,962,856 A * | 10/1999 | Zhao et al. | 250/370.09 |
| 6,031,935 A | 2/2000 | Kimmel | |
| 6,446,060 B1 | 9/2002 | Bergman et al. | |
| 2002/0109658 A1 | 8/2002 | Noguchi | |

FOREIGN PATENT DOCUMENTS

WO   WO 02/063387 A1   8/2002

OTHER PUBLICATIONS

Deborah C. Wang: Novel Routing Schemes for IC Layout Part 1: Two Layer Channel Routing, vol. CONF. 28, Jun. 1991, pp. 49-53. IEEE New York.

* cited by examiner

*Primary Examiner*—David P Porta
*Assistant Examiner*—Mark R Gaworecki

(57) ABSTRACT

The invention relates to a device (1) having a matrix array of electronic field elements ($F_{ij}$), which may for example be sensor elements of an X-ray detector or pixels of a display. The field elements ($F_{ij}$) are connected to access lines ($A_l$, $D_k$) which, starting from a driver circuit (2, 3) at the border of the array, are routed in zigzag fashion along diagonals. In this way it is possible to provide address lines ($A_l$) and data lines ($D_k$) which are locally orthogonal to one another and make it possible for individual field elements ($F_{ij}$) to be addressed unambiguously. The associated driver circuits (2, 3) may be arranged at the same border or at opposite borders of the matrix, so that an array of almost any desired length can be put together from the device (1) without gaps in one dimension.

20 Claims, 4 Drawing Sheets

DEVICE COMPRISING AN ARRAY OF ELECTRONIC ELEMENTS, BASED ON DIAGONAL LINE ROUTING

The invention relates to a device comprising an array of electronic field elements, such as sensors for example, said array consisting of rows and columns in the form of a matrix. Furthermore, it relates to an electronic apparatus composed of a number of such devices and also to a method of accessing electronic field elements of an array consisting of rows and columns in the form of a matrix.

Matrix arrays of essentially identical electronic field elements exist in a large number of electronic devices. Important examples include detectors for electromagnetic radiation such as e.g. X-ray detectors and CCD chips, and also display devices such as e.g. LCD or LED displays. It is characteristic of such devices that each individual field element is connected via at least one access line to a (driver) circuit which is arranged at the border of the matrix of field elements. In almost all cases the lines run in the direction of the rows ("x direction") or the columns ("y direction"). By way of example, in the case of an X-ray detector the sensor elements are connected row-wise to address lines and column-wise to data lines so that, by activating an address line, the measured values (charges) of all sensor elements connected to the line can be read in parallel on the data lines. In the case of a CCD chip, the row lines and column lines together serve to individually address the field elements, where in each case the field element at the crossover point of an active row line and an active column line is activated. A disadvantage of the arrays described above is that, for the evaluation circuits, in each case space is required on two side borders of the matrix that are orthogonal to one another. Therefore, a maximum of four such devices can be put together without gaps to form a larger matrix.

For X-ray detectors, matrix arrays are also known in which the driver circuits for the address lines or data lines are arranged on both sides of the matrix. It is thus possible, for example, for the lower half and the upper half of a matrix to be read by in each case one dedicated evaluation circuit arranged at the lower or upper border respectively, and this, on account of parallel operation, allows a corresponding increase in the bandwidth to be achieved.

Furthermore, WO 02/063387 A1 discloses a display device in which the driver circuits for rows and columns are arranged at the same border of the matrix. The address lines, which run as rows, in this case need to be connected via connecting lines, which run as columns, to their circuit which is arranged at the border of the matrix. The length of the connection paths between the various rows of the array and the evaluation circuit therefore varies greatly.

Against this background, it is an object of the invention to provide, in a device having a matrix array of electronic field elements, an alternative routing of the connecting lines from the field elements to a circuit at the border of the array, which alternative routing is intended, in particular, also to make it possible to arrange two complementary access wirings at the same border or at opposite borders of the matrix.

This object is achieved by a device having the features of claim 1, by an apparatus having the features of claim 9 and by a method having the features of claim 10. Advantageous refinements are given in the subclaims.

The device according to the invention comprises an array which consists of electronic field elements arranged in rows and columns in the form of a matrix. Preferably, the field elements are identical or similar to one another. Furthermore, the designations "row" and "column" are interchangeable here and are to be understood primarily in the sense of a logical division, so that they are not limited in the strictly geometrical sense to a rectilinear alignment of the field elements.

The device further comprises a (first) set of access lines, where each field element is connected to precisely one of these access lines. The term "access line" is in this case to be understood in a broad sense such that operations of any type on this line involve all field elements connected thereto, that is to say "access" them. This includes in particular the operation of addressing, in which activation of the access line by applying a predefined signal level selects the connected field elements, that is to say places them in a certain state. Furthermore, the access line may, for example, in the context of a data line, also divert signals from the connected field elements. In addition, an access line, in the context of a reset line, may serve to place field elements in a defined state, for example by supplying current or voltage.

The course of any access line through the matrix of field elements is characterized by the following two features:

1. The access line runs in zigzag fashion along diagonals of the matrix from border column to border column. That is to say that the access line runs from one element of an border row, along a diagonal, until it reaches an border column of the matrix for the first time, where it turns and runs orthogonally to the original direction along the other diagonal of the matrix until it reaches the opposite border column, where it again turns orthogonally so as to again follow the first diagonal and so on.

2. At each of its turning points, the access line connects two field elements to one another, these field elements lying in the same border column in two successive rows. That is to say that the access line, at the end of a first diagonal, once it has reached a field element in an border column, jumps forward by one row, as a result of which it reaches the field element of a neighboring row in the same border column. From here, the access line then runs in the manner described above along the other diagonal again, further through the matrix. The extensions of the sections of the access line running along diagonals thus intersect one another at a point which lies about half a column width outside the matrix.

A device of the type defined above has a particularly advantageous routing of the access lines which runs essentially diagonally through the matrix array. A characteristic feature of this is that all access lines have essentially the same length and that each access line runs in a step-like manner from one field element to a field element which is adjacent thereto (diagonally or in the column direction). Despite the (functionally) rectangular shape of the matrix array of field elements, by virtue of these two properties a uniform connection of the field elements along diagonals is made possible, and this may be advantageous in many applications.

An important application of this type lies in a development of the device, in which there is a second set of access lines within the context defined above. For reasons of distinguishability, these second access lines will be referred to hereinafter as "secondary lines", although there is a priori no difference from the access lines as claimed in claim 1. In said development of the device, each field element is connected to precisely one of the secondary lines, where each secondary line runs in zigzag fashion along diagonals of the array from border column to border column and at each turning point connects two field elements which lie in the same border column and two successive rows. The secondary lines thus satisfy all the criteria of access lines as claimed in claim 1, so that a device having (only) the secondary lines would also fall within the scope of protection of said claim. The particular interaction of access lines and secondary lines consists in that any given access line and any given secondary line together make contact with precisely one field element. Each field element is therefore connected to precisely one access line and to precisely one secondary line, although there are no two field elements which would simultaneously be connected to the same access line and the same secondary line.

In the development described above, a coupling of the field elements to access lines and secondary lines is achieved which corresponds in functional terms to the row and column connections of conventional matrix arrays. That is to say that, in addressing applications, each field element can be selected individually by activating the associated access line and secondary line. The access lines and the secondary lines can thus serve to select the addressing of individual field elements. In a similar way, in sensor applications, all field elements connected to an access line can be activated and their signals can be read via a respectively dedicated secondary (data) line. That is to say that the secondary lines serve for reading data from field elements that can be selected via access lines.

On account of the particular zigzag course of the access lines and secondary lines, the driver circuits of the access lines and secondary lines can be arranged at any border of the matrix without any additional complexity for the line routing. In particular, they can therefore be arranged both at the same border or at opposite borders, which makes it possible to put together any number of devices without gaps at least in one dimension. The invention thus also relates to a device having in each case one driver circuit for the access lines and the secondary lines, where the driver circuits are located at the same border or at opposite borders of the matrix array.

The field elements may be almost any electronic units which are to be used in a matrix array. Preferred examples of such field elements are: sensors, in particular detector elements for electromagnetic radiation, such as X-radiation for example; signal-emitting units, in particular pixels of a display; memory cells for data; and actuators such as micromechanical servomotors for a reflective surface consisting of micromirrors. The diagonal line routing and in particular the one-sided array of driver circuits of two corresponding access line systems can be used advantageously in many applications.

According to another development of the device, the latter has a further set of access lines which pass through the array of field elements in the column direction without making contact with field elements. Such a device can be supplemented by rows of additional field elements, where access can be made to the additional field elements by means of the further access lines and where the associated driver circuit lies on the same border of the overall array as the driver circuit for the (first) access lines. In this way, the height of a matrix array of field elements can be made to be of almost any size (even if in practice primarily only a doubling in height ever occurs), where the individual height sections are preferably all internally wired with access lines running in zigzag fashion.

When in the abovementioned device the access lines are to run in sections "along diagonals" of the matrix array, this phrase is to be understood with reference to a scale in the order of magnitude of the field elements. In particular, an access line is considered to run "along a diagonal" if it remains in a strip having approximately twice the width of a field element about the diagonal. The "microscopic" geometric course of the access lines therefore does not strictly need to follow a straight line. Preferably, the access lines run in a stepped manner along the direction of the diagonals, so that they can in each case be routed to the border of the field elements and do not cross, for example, sensory areas of the field elements.

The invention further relates to an electronic apparatus having an array of field elements arranged in rows and columns in the form of a matrix, which apparatus is composed of devices of the type mentioned above. Since in such devices the driver circuits for the access lines (including the so-called secondary lines) can be arranged at one border or at opposite borders of the matrix, matrices of field elements of almost any desired length can be put together from said devices without gaps at least in one direction.

Furthermore, the invention relates to a method of accessing electronic field elements of an array of field elements consisting of rows and columns in the form of a matrix, where "accessing" can mean addressing or reading of data for example. In the method, in each case all field elements along a line are accessed at the same time, where the line runs in zigzag fashion along diagonals of the array from border column to border column of the array and at each turning point connects two field elements from the same border column and two successive rows to one another.

The method may in particular be implemented with a device of the type mentioned above. It may furthermore be developed by the features emerging from the variants of this device. The advantage of the method, as mentioned in connection with the device, lies in the fact that, starting from an border row of the matrix array, a successive sequence of adjacent field elements along matrix diagonals can be addressed.

The invention will be further described with reference to examples of embodiments shown in the drawings to which, however, the invention is not restricted.

Figure 1:
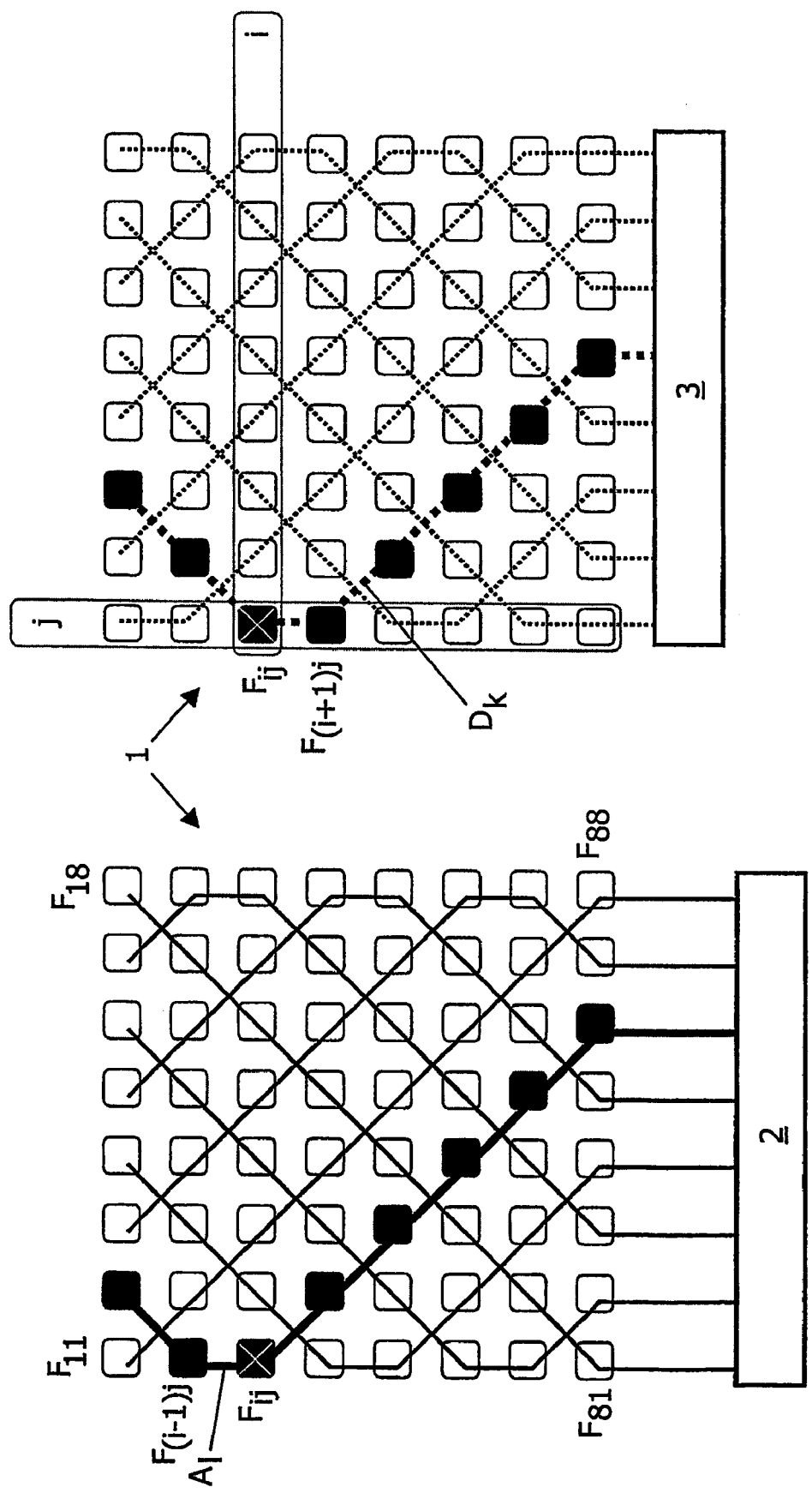
FIG. 1 shows separately, for an array according to the invention having 8×8 electronic field elements, the routing of the address lines (on the left) and of the data lines (on the right).

FIG. 1 shows (twice for a better representation) a square 8×8 matrix array 1 of sixty-four electronic field elements $F_{11}, \ldots F_{18}, \ldots F_{(i-1)j}, \ldots F_{ij}, \ldots F_{81}, \ldots F_{88}$. The field elements may be almost any electronic units which are arranged in such a matrix. In particular, the field elements may be pixels of an LCD, LED or TFT display or the like, as are used for example for flat-screen displays in notebooks, palmtops, mobile telephones and also for large displays in airports or the like. In another refinement shown below in a representative manner, the field elements are sensor units of an X-ray detector.

In such arrays, the field elements are usually contacted along rows i by row access lines and along columns j by column access lines, where, based on the use of an X-ray detector, the row access lines will be referred to below, without limiting the general nature thereof, as "address lines" and the column access lines will be referred to as "data lines" (or also "secondary lines"). In the prior art, the driver circuits for the address lines are arranged along an border column and the driver circuits for the data lines are arranged along an border row. This is disadvantageous in that two borders of the matrix array which are orthogonal to one another are "blocked" by the driver circuits. Therefore, a maximum of four such matrix arrays (in each case rotated through 90° with respect to one another) can be put together without gaps to form a larger matrix, where two of these matrix arrays still generally have to be designed in the form of a mirror image in terms of the data lines and address lines, so that in the larger matrix all data driver circuits and address driver circuits come to lie at the same border.

In order to avoid these disadvantages, according to the invention the routing of the address lines $A_l$ and of the data lines $D_k$ which is shown in FIG. 1—for the sake of clarity shown separately on the left and on the right, respectively—is proposed (note: the lines are in each case not connected at their crossover points). As can be seen, for example, from the address line $A_l$ shown in bold in the figure, the course of the address lines can be characterized as follows (the same applies for the data lines):

Starting from a driver circuit 2, the address line $A_l$ begins at a field element ($_{F86}$) in the last border row of the matrix array 1;

The address line $A_l$ runs along a first diagonal until it reaches, in row i, an border column of the array (in the example, the left-hand border column having the field elements $F_{*l}$) at a field element $F_{ij}$ (in the example: i=3, j=1);

The address line $A_l$ runs from the reached field element $F_{ij}$ to the above-lying field element $F_{(i-1)j}$ of the preceding row (i−1) of the same border column;

The address line $A_l$ turns so that it is orthogonal to its original diagonal course and runs further along a diagonal of the array 1 which is rotated through 90°;

Upon reaching the first border row of the array (having the field elements $F_{j*}$), the address line $A_l$ ends.

All field elements on which the address line runs are connected to the address line $A_l$ (see field elements marked in black in FIG. 1). Based on the above prescribed course for the address lines $A_l$, in the matrix 1 shown in FIG. 1 there are only two possibilities to connect all the field elements $F_{ij}$, namely, on the one hand, the possibility shown on the left for the address lines $A_l$ and, on the other hand, the possibility shown on the right for the data lines $D_k$. This results, for example, from the fact that, for a line beginning at the corner field element $F_{81}$, there are only the course variants shown on the left and on the right in FIG. 1, where the courses of the other lines compulsorily arise from the respectively selected variant if the above criteria in this respect are to be met.

It is characteristic of the described line routing that
each field element $F_{ij}$ is connected to precisely one address line $A_l$ and precisely one data line $D_k$;
no two field elements are connected to the same address line $A_l$ and the same data line $D_k$.

By virtue of these properties, using the line routing shown, an access to the field elements is possible which corresponds in functional terms to the row and column addressing of conventional routings. By way of example, access can be made to the field element $F_{ij}$ marked with a cross in FIG. 1 by means of the lines $A_l$ and $D_k$ individually, said lines being shown in bold. If the field element $F_{ij}$ were to be, for example, a light-emitting diode LED of a display, this could be activated by simultaneous activation of the address line $A_l$ and of the "secondary line" $D_k$. If, on the other hand, the field elements are, as assumed, sensor elements of an X-ray detector, the marked field element $F_{ij}$ would be selected by activating the address line $A_l$ and its data would then be passed over the data line $D_k$ to the evaluation circuit 3 connected to the data lines. On account of the locally right-angled course of address lines $A_l$ and data lines $D_k$, it is ensured that all field elements (shown in black in FIG. 1) selected by the address line $A_l$ can be read on separate data lines.

In the zigzag-type line routing shown in FIG. 1, it is advantageous that in the case of a diagonal course of the lines within the matrix array 1, all access lines are (essentially) the same length and always connect, in a step-like manner, two field elements that are adjacent (diagonally or in terms of rows). Relatively large irregularities in the coupling, which may be noticeable in artifacts in electronic evaluation or control, are thereby avoided. Furthermore, compared to the conventional line routing in terms of rows and columns, it is advantageous that, in the event of a failure of adjacent address lines or data lines, it is not a double row or double column that is disrupted, but rather the relevant pixels are (predominantly) isolated, that is to say are surrounded by functioning pixels. In this way, a much easier and more precise error correction can be carried out by interpolating the faulty pixels.

In the case of X-ray detectors on a TFT basis, besides a data line and an address line an additional reset line or "bias line" is required at each sensor element. These are not used to individually address sensor elements, but rather the reset lines serve to initialize or delete the image points before or after the reading of an image. The reset lines may likewise be routed "in zigzag fashion" as in the case of the abovementioned address lines $A_l$ or data lines $D_k$. For example, the line system shown on the left in FIG. 1 could be provided in an identical manner for the reset lines. However, since the reset lines do not individually address the sensor elements, a simple linear routing of the reset lines along columns (or rows) can be combined with the zigzag array of the address lines and data lines.

Figure 2:
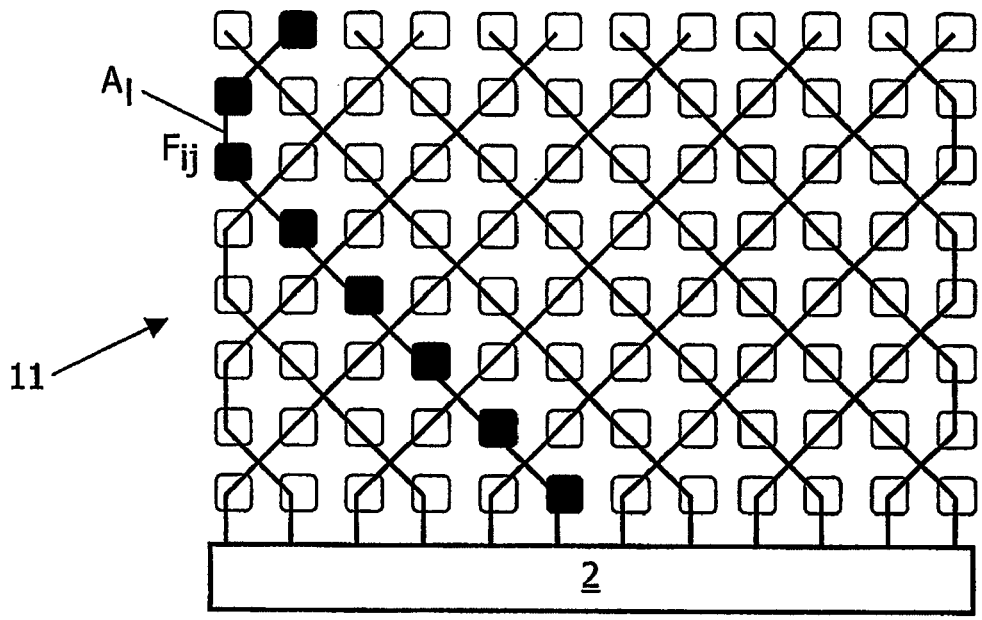
FIG. 2 shows the routing of the access lines in a non-square matrix array of field elements.

FIG. 2 shows a non-square 8×12 matrix array 11 of field elements $F_{ij}$ together with the address lines $A_l$ routed as defined above. The routing of the secondary lines (data lines or second set of address lines) is similar to that shown in FIG. 1 and is not shown in any more detail. In order that the address lines and the data lines allow individual access to the field elements $F_{ij}$, as is shown at least one set of these lines must start from the longer side of the matrix array.

Figure 3:
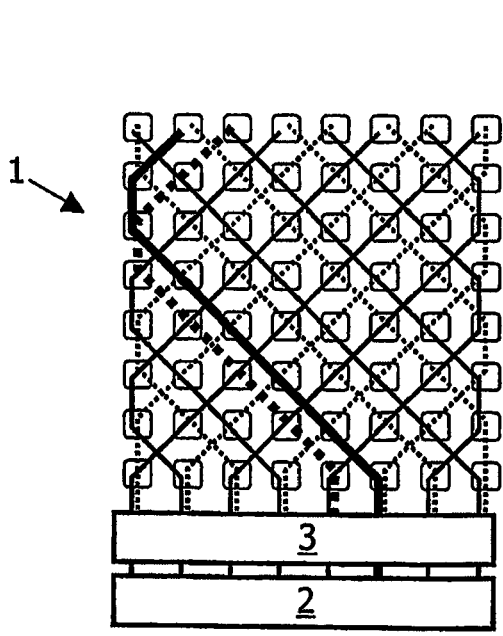
FIG. 3 shows a device having a one-sided array of the driver circuits of address lines and data lines.
Figure 5:
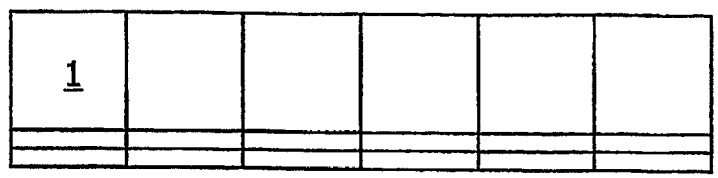
FIG. 5 shows an apparatus composed of a number of devices according to the invention as shown in FIG. 3.

FIG. 3 shows the array of FIG. 1 again in a joint representation of the address lines and data lines. The important advantage of the proposed line routing, which has not yet been discussed, can be seen here in that the driver circuits 2 and 3 for the address lines and the data lines can be arranged at the same border below the matrix array 1. This in turn allows the construction, as shown in FIG. 5, of an apparatus having a matrix array of field elements which is of almost any desired length in the x direction and is made up of a number of devices 1 as shown in FIG. 3 (so-called "multi-butting"). To double the height, two such devices could be placed on top of one another by their uppermost border rows, rotated through 180° (not shown).

Figure 4:
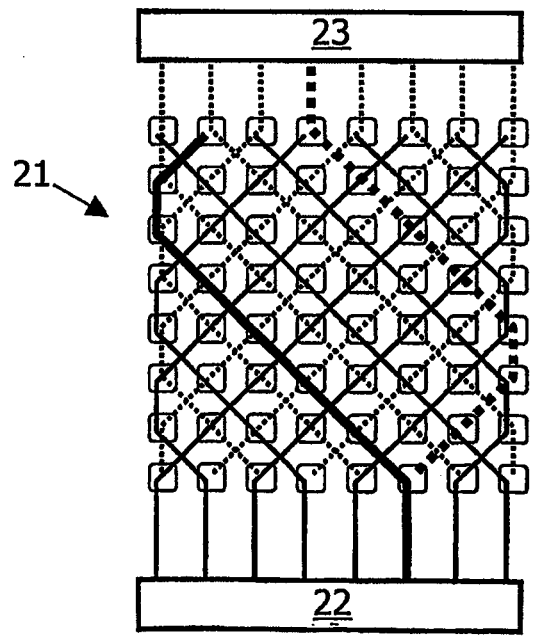
FIG. 4 shows a device having a two-sided array of the driver circuits of address lines and data lines.
Figure 6:
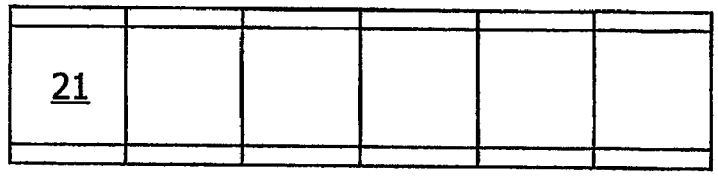
FIG. 6 shows an apparatus composed of a number of devices according to the invention as shown in FIG. 4.

FIG. 4 shows an alternative device 21 in which the address lines and data lines are routed within the matrix array as shown in FIG. 1 or FIG. 3, but with the driver circuit 22 for the address lines being provided at the lower border of the array 21 and the driver circuit 23 for the data lines being provided at the opposite, upper border of the array 21. One advantage of such an array lies in the fact that the line supply to a driver circuit does not have to traverse the other driver circuit. As shown in FIG. 6, the advantage is additionally also retained that in the x direction a gap-less matrix array of such devices 21 which is of almost any desired length is provided.

Figure 7:
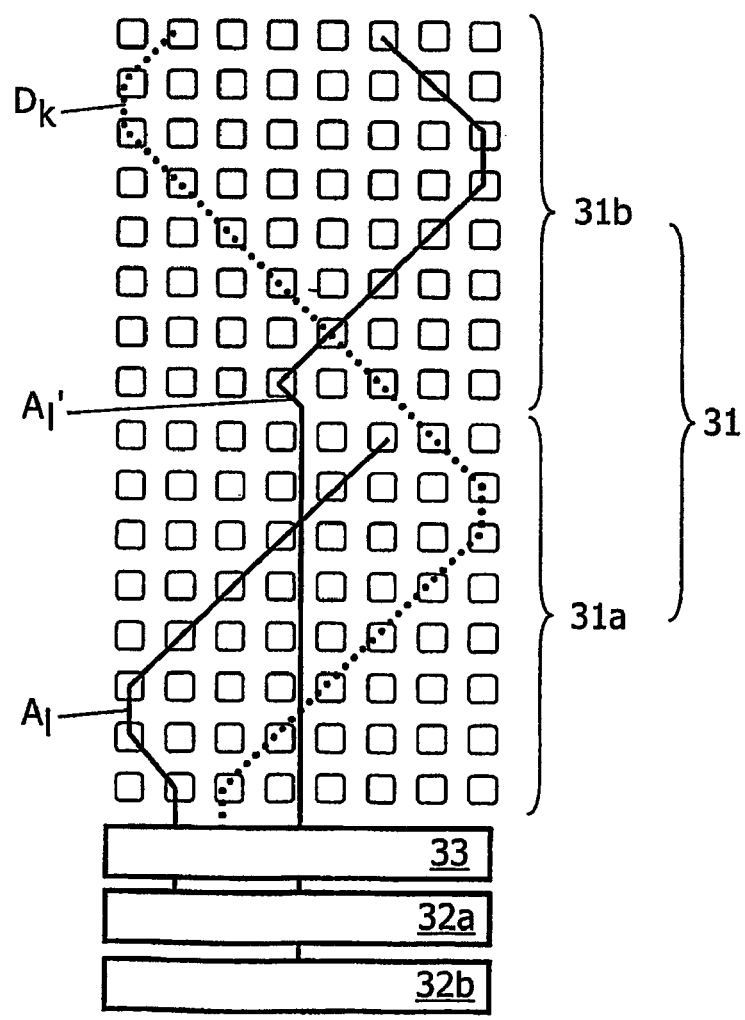
FIG. 7 shows a non-square array of field elements having wiring of the address lines starting from an border side, which wiring is divided into two sections.

FIG. 7 shows a modified device 31 in which, based on the array shown in FIG. 1, twice the number of rows of field elements are provided. The lower section 31a in the figure, of 8×8 field elements, is connected to address lines $A_l$ and data lines $D_k$ in a manner similar to FIG. 1, where only one representative of these is shown in FIG. 7. The address lines $A_l$ are supplied, at the lower border of the array, to a driver circuit 32a, while the data lines $D_k$ come from a driver circuit 33 which in the example shown is also located at the lower border.

The coupling of the upper 8×8 section 31b of the device 31 is effected, with respect to the data lines $D_k$, by the continual extension thereof in accordance with the basic zigzag course. In order to ensure the unambiguous nature of the access to the field elements, separate address lines $A_l'$ must be provided for the upper section 31b. In the example of FIG. 7, starting from a driver circuit 32b arranged at the lower border, these run in a column-like manner in a straight line through the lower matrix section 31a, without making contact with field elements there. Starting from the lowermost row of the upper section 31b, the separate address lines $A_l'$ then run through this section 31b in the known zigzag fashion. In this way, a matrix array 31 of twice the height can be addressed by electronics arranged on one side.

As a modification of the embodiment shown in FIG. 7, it is of course also possible for parts of the driver circuits, for instance the driver circuit 33 for the data lines and/or the driver circuit 32b for the second set of address lines $A_l'$, to be arranged at the upper border of the matrix array 31. In a manner similar to that shown in FIGS. 5 and 6, an array that is of any desired length in one direction can furthermore be produced from devices 31 as shown in FIG. 7 which are contacted on one side or two sides.

Figure 8:
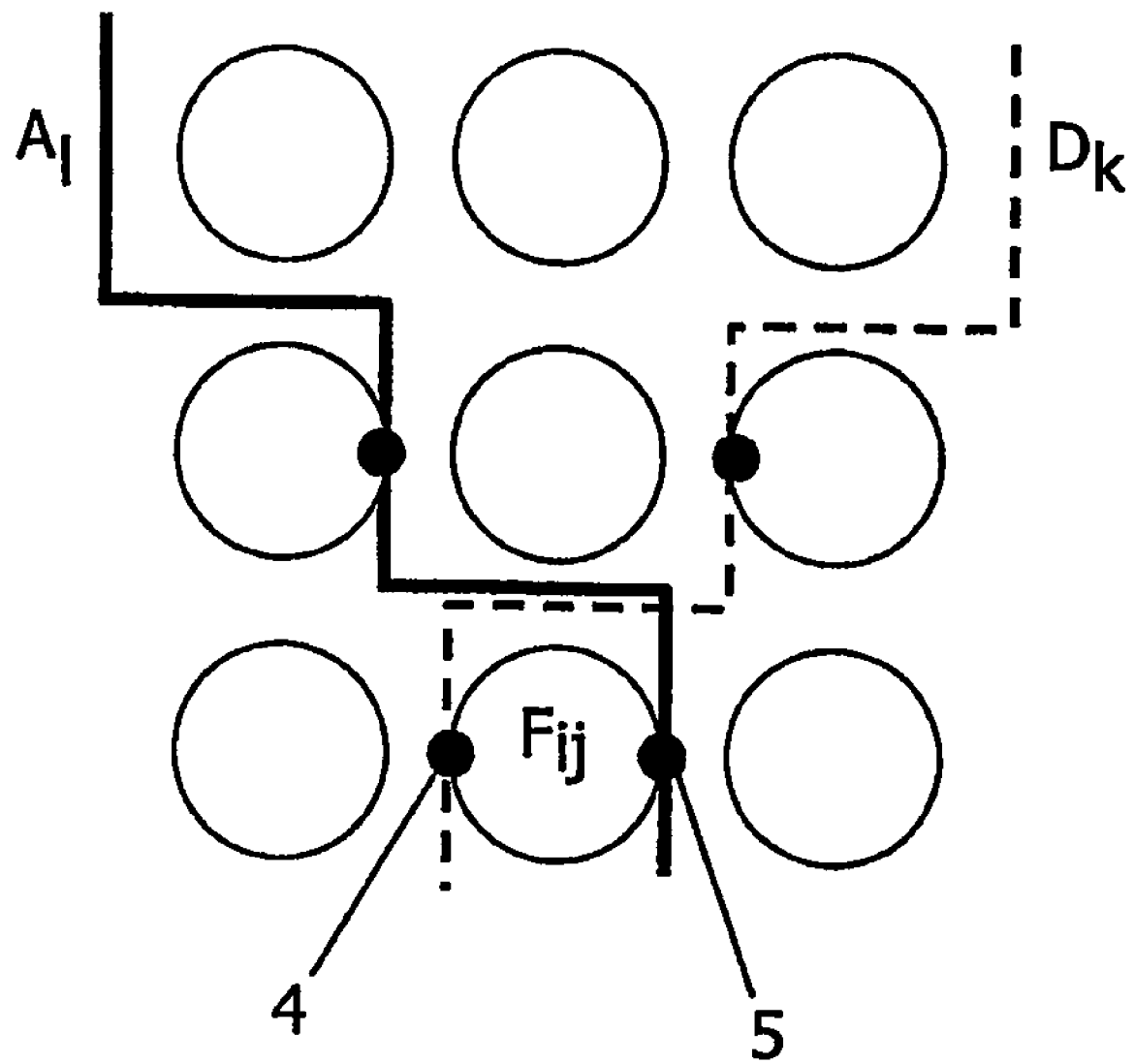
FIG. 8 shows the "microscopic" course of access lines along the field elements.

FIG. 8 schematically shows the "microscopic" course of in each case one address line $A_l$ and one data line $D_k$ shown in a representative manner. These lines do not need to run strictly along a geometric straight line, but rather can follow the diagonals of the matrix array in the center, in particular in a stepped manner as shown. By means of the stepped course, the lines are routed along at the outer border of the field elements $F_{ij}$, where they make contact with the latter in each case at a point 4 or 5.

The invention claimed is:

1. A device comprising an array of electronic field elements said array consisting of rows and columns in the form of a matrix, wherein
   a) a first subset of field elements is connected to precisely one access line among a set of several access lines, and
   b) the access line runs in zigzag fashion along a diagonal of the array and at each turning point connects two field elements from a same border column and two successive rows.

2. A device as claimed in claim 1, wherein
   c) a second set of field elements is connected to precisely one secondary line among a set of several secondary lines,
   d) the secondary line runs in zigzag fashion along a diagonal of the array and at each turning point connects two field elements from the same border column and two successive rows, and
   e) any given access line and any given secondary line in each case together make contact with precisely one field element.

3. A device as claimed in claim 2, wherein the access lines and the secondary lines serve to select the addressing of individual field elements.

4. A device as claimed in claim 2, wherein the secondary lines serve to read data from field elements which can be selected via an access line.

5. A device as claimed in claim 2, wherein the access lines and the secondary lines are in each case connected to a driver circuit where the driver circuits are provided at the same border or at opposite array.

6. A device as claimed in claim 1, wherein the field elements are sensors, in particular detector elements for X-radiation, signal-emitting elements, in particular pixels of a display, memory cells and/or actuators.

7. A device as claimed in claim 1, wherein said array comprises first and second portions of electronic field elements, further comprising a second set of access lines, which access lines pass through said first portion of the array of field elements in a column direction without making contact with the field elements comprising said first portion.

8. A device as claimed in claim 1, wherein the access lines run in a stepped manner along diagonals of the array.

9. An electronic apparatus having an array of field elements arranged in rows and columns in the form of a matrix, which apparatus is composed of devices as claimed in claim 1.

10. A method of accessing electronic field elements of an array consisting of rows and columns in the form of a matrix, where access is in each case made simultaneously to all field elements along access lines which run in zigzag fashion along diagonals of the array and at each turning point connects two field elements from the same border column and two successive rows.

11. The method of claim 10, where access is in each case made simultaneously to all field elements along secondary lines which run in zigzag fashion along diagonals of the array and at each turning point connects two field elements horn the same border column and two successive rows.

12. The method of claim 11, wherein the access lines and the secondaxy lines serve to select the addies sing of individual field elements.

13. The method of claim 11, wherein the secondary lines serve to read data fiom field elements which can be selected via an access line.

14. The method of claim 11, wherein the access lines and the secondary lines are in each case connected to a diiver circuit, where the driver circuits are provided at the same border or at opposite borders of the array.

15. The method of claim 10, wherein the field elements are sensors, in particular detector elements for X-radiation, signal-emitting elements, in particular pixels of a display, memory cells and/or actuators.

16. The method of claim 10, wherein said array comprises first and second portions of electronic field elements, further comprising a second set of access lines, which access lines pass though said first portion of the array of field elements in a column direction without making contact with the field elements comprising said first portion.

17. The method of claim 10, wherein the access lines run in a stepped manner along the diagonals.

18. A device comprising an array of electronic field elements, said array consisting of tows and columns in the form of a matrix comprising first and second portions of electronic field elements, wherein
   a first subset of field elements is connected to precisely one access line among a set of several access lines, the access line runs in zigzag fashion along a diagonal of the array and at each turning point connects two field elements from a same border column and two successive tows, and a second set of access lines passing though the first portion of the array of field elements in a column direction without making contact with the field elements comprising the first portion.

19. A device as claimed in claim 18, wherein a second subset of field elements is connected to precisely one secondary line among a set of several secondary lines, the secondary line runs in zigzag firshion along a diagonal of the array and at each turning point connects two field elements fiom the same border column and two successive rows, and any given access line and any given secondary line in each case together make contact with precisely one field element.

20. A device as claimed in claim 18, wherein the field elements are sensors, in particular detector elements for X-radiation, signal-emitting elements, in particular pixels of a display, memory cells and/or actuators.

* * * * *